(12) United States Patent
van der Lely et al.

(10) Patent No.: US 6,938,576 B2
(45) Date of Patent: Sep. 6, 2005

(54) DEVICE FOR AND A METHOD OF MILKING AN ANIMAL, A DEVICE FOR MONITORING AN ANIMAL

(75) Inventors: Alexander van der Lely, Rotterdam (NL); Karel van den Berg, Bleskensgraaf (NL); Renatus Ignatius Josephus Fransen, Vlaardingen (NL); Eduard Lodewijk Meijer, The Hague (NL); Adrianus Maria Seerden, Rijnsburg (NL)

(73) Assignee: Lely Enterprises A.G. A Swiss Limited Liability Co., Zug (CH)

( * ) Notice: Subject to any disclaimer, the term of this patent is extended or adjusted under 35 U.S.C. 154(b) by 0 days.

(21) Appl. No.: 10/073,023

(22) Filed: Feb. 12, 2002

(65) Prior Publication Data

US 2002/0108576 A1 Aug. 15, 2002

(30) Foreign Application Priority Data

Feb. 13, 2001 (NL) ............................................. 1017354

(51) Int. Cl.⁷ ............................................. A01K 29/00
(52) U.S. Cl. .................. 119/14.02; 119/14.18
(58) Field of Search ............................ 119/14.18, 421, 119/14.02, 14.01, 14.14, 14.08

(56) References Cited

U.S. PATENT DOCUMENTS

| | | | | |
|---|---|---|---|---|
| 5,568,788 A | * | 10/1996 | van den Berg et al. ... | 119/14.02 |
| 5,697,326 A | * | 12/1997 | Mottram et al. ............ | 119/174 |
| 5,816,190 A | * | 10/1998 | van der Lely ........... | 119/14.08 |
| 5,873,323 A | * | 2/1999 | van den Berg et al. ... | 119/14.02 |
| 5,878,692 A | * | 3/1999 | Ornerfors ................ | 119/14.08 |
| 6,443,093 B1 | * | 9/2002 | van der Lely et al. .... | 119/14.01 |
| 6,488,635 B1 | * | 12/2002 | Mottram ..................... | 600/551 |
| 2002/0124810 A1 | * | 9/2002 | Verburg et al. ............. | 119/665 |

FOREIGN PATENT DOCUMENTS

| | | |
|---|---|---|
| EP | 988786 A2 | 9/1999 |
| NL | 1000883 | 1/1997 |
| WO | WO 99/01026 | 7/1998 |
| WO | WO 99/01026 * | 1/1999 |
| WO | WO 00/13393 | 8/1999 |
| WO | WO 01/10197 A1 | 7/2000 |
| WO | WO 01/17340 A1 | 9/2000 |

* cited by examiner

*Primary Examiner*—Yvonne R. Abbott
(74) *Attorney, Agent, or Firm*—Penrose Lucas Albright

(57) ABSTRACT

An apparatus and method for milking an animal, in particular a cow, that uses a stress measuring device for determining the animal's degree of stress and to supply stress measurement data to a memory that stores the stress measurement data. Stress measurement data are obtained before, during and preferably after milking. The stress measuring device comprises at least one instrument selected from a group consisting of an infrared meter for measuring the animal's infrared image, a hygrometer for determining the humidity of the animal's fur or nose, and iris scanner for determining the animal's eye characteristics, and an odor meter for determining the animal's breath or body odor, a muscular tension measuring instrument for determining the animal's muscular tension, an excrement analyzing instrument for determining the characteristics of the animal's excrement, and a muscle vibration meter for determining the animal's muscle vibrations.

46 Claims, 2 Drawing Sheets

DEVICE FOR AND A METHOD OF MILKING AN ANIMAL, A DEVICE FOR MONITORING AN ANIMAL

FIELD OF THE INVENTION

The invention relates to an apparatus for milking an animal, in particular a cow.

BACKGROUND OF THE INVENTION

Such an apparatus is known. Although the known apparatuses function satisfactorily, there are differences in milk yield and milk quality which cannot be attributed, as such, to the functioning of the apparatus or the physical condition of the animals. Consequently, there is a need for an improved apparatus for milking an animal.

It is an object of the instant invention to provide an apparatus for milking animals by means of which it is possible to satisfy this need at least partially.

For that purpose, according to the invention an apparatus for milking an animal of the above-mentioned type is characterized by providing a stress measuring device for determining the degree of stress experienced by the animal due to the milking process, transmitting such measurements to storage means such as a computer memory as relates to the animal's stress before, after and during milking. The invention is based on the insight that the milk yield and the milk quality are not only determined by the physical conditions of health of an animal or the functioning of the milking device, but also by the degree of stress from which an animal suffers. By measuring, according to the invention, the stress of an animal before and during and preferably also after milking, there can at least be obtained evidence as to the conditions influencing the milk yield or the milk quality. These additional data may be used for making the milking apparatus function more efficiently. In this situation by "milking" is meant milking during a milking run.

In this connection it is noticed that from International Patent Application No. PCT/SE98/01305, filed Jul. 2, 1998, International Publication No. WO 99/01026, published Jan. 14, 1999, of Hall et al, it is known to monitor abnormal behavior of an animal, such as by means of a movement meter, a respiration meter or a heartbeat meter. This milking can for example be interrupted when a certain abnormal behavior gives reason therefor. However, measuring of the degree of stress before and during milking is not known from this document.

Furthermore, from Netherlands Application No. 1000883, published Jan. 28, 1997, of Dade te Hants, it is known to use a smell sensor for breath or body odors for animal identification or health determination or for both purposes. However, measuring the degree of stress before and during milking is not known from this document.

Furthermore, from International Patent Application No. PCT/IL99/00452, filed Aug. 23, 1999, International Publication No. WO 00/13393, published Mar. 9, 2000, of Bar-Shalom, it is known to process animal sounds and to supply in dependence thereof a signal to a manager. However, measuring the degree of stress before and during milking is not known from this document.

Furthermore, from U.S. Pat. No. 5,878,692, of Ornerfors, which issued Mar. 9, 1999, it is known to take an action in reaction to the measuring of animal sound, such as by opening a gate of a milking robot when the animal is in a panic. However, measuring the degree of stress before and during milking is not known from this document.

Furthermore, from XP-002176510, Malyshev et al, BUL.30, Aug. 15, 1987, SU 1,329,719 it is known to measure stress of animals by means of lymphocyte fraction and by measuring the electrophoretic mobility. However, measuring the degree of stress before and during milking is not known from this document.

Furthermore, from European Patent Office EP 0 988 786, of Herbert, dated Sep. 22, 1999, it is known to determine animal sound owing to stress and, accordingly, automatically to bring about a reaction thereto. In this situation sounds issued by animals are analyzed and possibly converted into control commands. Besides, images or movements or both may be analyzed, if desired. However, measuring the degree of stress before and during milking is not known from this document.

SUMMARY OF THE INVENTION

In an embodiment of an apparatus according to the invention, it is provided with means for determining milk related data and the storage device is adapted to store the stress management data together with the milk related data. In this manner there can be established a relation between the stress management data before, during and after milking and the milk related parameters, such as milk yield, milk quality (fat content, protein content, etc.).

In particular the means for determining milk related data are suitable for determining the milk flow per udder quarter of an animal during milking.

In order to be able to process the data accurately for each animal, the device is preferably provided with an animal identification system and with a central unit provided with a computer having a memory, said memory being adapted to contain animal data for each animal in relation to the stress. Additionally or alternatively the data may also be processed for a group or herd of animals.

It has appeared that for the determination of stress of an animal, different parameters provide a stronger indication of the stress. Consequently it is important to store the stress related data for each animal in the memory and, on determination of the degree of stress of an animal, to use in particular that stress measuring device or that combination of stress measuring devices that provides a clear indication for that animal. This in contrast with the known devices that are used without distinction for all animals. Therefore, the invention also relates to a device for determining the degree of stress of an animal, the device being provided with an animal identification system, various stress measuring devices, a memory for containing an indication which stress measuring device is most suitable for a particular animal, and with an activation device that activates after animal identification the at least one relevant stress measuring device. Out of all possible parameters that can be measured on an animal the following have proved to be extremely suitable, the parameters being indicated in connection with a device for determining them:

An infrared meter for measuring an infrared image of the animal;

A camera, in particular a video camera, for determining the position of the ears or head or tail or any combination thereof of the animal;

A hygrometer for determining the humidity of the fur or the nose of the animal;

A movement behavior meter, such as a video camera, a step counter, for determining the movement behavior, in particular the movement activity, of the animal;

An eye meter, such as a video camera or iris scanner, for determining the eye characteristics of the animal;

A smell meter or odor meter for determining the breath or body odor of the animal;

A muscular tension measuring device, such as a muscle contraction meter or video camera, for determining the muscular tension of the animal;

A video camera for determining whether the animal has its tongue outside its mouth;

A blood analyzer for determining the concentration of blood components, such as oxygen, hormones, or blood cells, of the animal;

An excrement analyzing device for determining the characteristics of the excrement of the animal;

A heartbeat meter for determining the heartbeat of the animal;

A thermometer for determining the temperature of the animal; and

A muscle vibration meter for determining the muscle vibrations of the animal.

The invention also relates to a device for monitoring an animal, in particular a cow, the device comprising a stress measuring device for determining stress of the animal, characterized in that the stress measuring device comprises a device selected from the group consisting of an infrared meter for measuring an infrared image of the animal, a hygrometer for determining the humidity of the fir or the nose of the animal, an iris scanner for determining the eye characteristics of the animal, a smell or odor meter for determining the breath or body odor of the animal, a muscular tension measuring device for determining the muscular tension of the animal, an excrement analyzing device for determining the characteristics of the excrement of the animal, and a muscle vibration meter for determining the muscle vibrations of the animal.

To be able to monitor the well-being of a dairy cow and also to increase the milk production, in a preferred embodiment of a device according to the invention, the device is disposed in a compartment for milking or foremilking or cleaning certain parts, such as the teats of the animal, or in post-treatment, or a compartment for any combination thereof. There is preferably disposed a milking robot in the milking compartment.

For the purpose of facilitating data transmission, the stress measuring device is provided with a buffer memory for containing a number of measurement data. As a result thereof the measurement data do have not to be transmitted or read continuously. For that purpose the stress measuring device is preferably provided with a transmitter for transmitting data. The stress measuring device is preferably provided with a receiver for receiving transmission in an order, so that energy is saved and the stress measuring device can be driven for a long period on batteries or other limited energy sources.

Although it is possible to process the data for each stress measuring device separately, for obtaining an accurate indication the device is preferably provided with a central unit comprising a computer having a memory for processing measurement data measured by the stress measurement device. As a result thereof it is possible to combine in a simple manner different parameters for obtaining a stress indication. This central unit is in particular provided with a reading device for reading the stress measuring device.

When the central unit comprises a correspondence table, said correspondence table containing for each animal stress related data, such as limit values, historical data and tolerance ranges, there can not only be provided an indication of the momentarily measured value of a stress parameter, but an indication can be obtained whether the momentarily measured value leads to special action by, for example, the farmer. For that purpose in particular the central unit is provided with a comparing device for comparing the measurement data with the data in the correspondence table or for comparing the stress measurement data obtained before, during, and preferably also after milking during a milking run or for doing both. The computer is preferably loaded with a program for giving, on the basis of the comparison of the comparing device, an indication about the amount of stress of the animal.

After comparison of the momentarily measured values of the parameters with the correspondence table after mutual comparison of the stress measurement data, there can also be provided an indication whether the animal runs the risk of showing stress, such as by comparing the stress pattern in successive measurements. For that purpose the computer program is preferably suitable for giving a prognosis of the stress behavior.

The parameters providing an indication of stress varying per animal, it is advantageous when the device is provided with various stress measuring devices, the computer containing an algorithm for attributing a weighing factor to a particular stress measurement data.

For the purpose of displaying the processed data, the central unit is provided with a signal issuing device for issuing a signal after receipt and processing of the stress measurement data. The signal preferably produces an image on a display screen, printer or the like providing information about the stress behavior of the animal.

The device comprises an animal identification system of an appropriate known type. Such an animal identification system provides the possibility of collecting the measurement data for each animal, comparing them and the like. The invention also relates to an animal identification system comprising means for connecting the animal identification system with a GPS-system. This makes it possible to determine the position of an animal, for example, a cow, in a shed. As a result of the fact that the position can be determined, an automatic analysis vehicle that traces an animal can be used and determines the stress parameters on the spot. The invention also relates to such an automatic GPS-controlled analysis vehicle for determining stress parameters. Such a vehicle may also contain the central unit.

The device preferably comprises a stress measuring device, that stress measuring device preferably supplying a signal to an alarm device on the basis of the stress measured.

The invention also relates to a method of milking an animal, in particular a cow, characterized in that the method comprises the step of determining stress of the animal before and during, and preferably also after milking.

BRIEF DESCRIPTION OF THE DRAWINGS

The invention will now be explained in further detail with reference to the accompanying figures, in which.

DETAILED DESCRIPTION OF THE
PREFERRED EMBODIMENTS OF THE
INVENTION

Before proceeding more deeply into a description of the embodiments of the invention, first the basis of the invention will be described briefly. Stress can manifest itself by various behavioral reactions, possibly in combination with physiological reactions. In particular on the basis of the specific combination of such reactions, a stress reaction can be distinguished from a physical adaptation to a changing environment. In other words, there does not exist one parameter for unequivocally indicating stress, although one parameter appears to provide a stronger indication of the degree of stress than another parameter. For each animal there appears to be a particular parameter, or a limited number of parameters, which with regard to the determination of stress is, as such or in combination, more important than other parameters. Therefore, combining different parameters, in particular behavioral parameters and physiological parameters, provides an improved monitoring of an animal.

Figure 1:
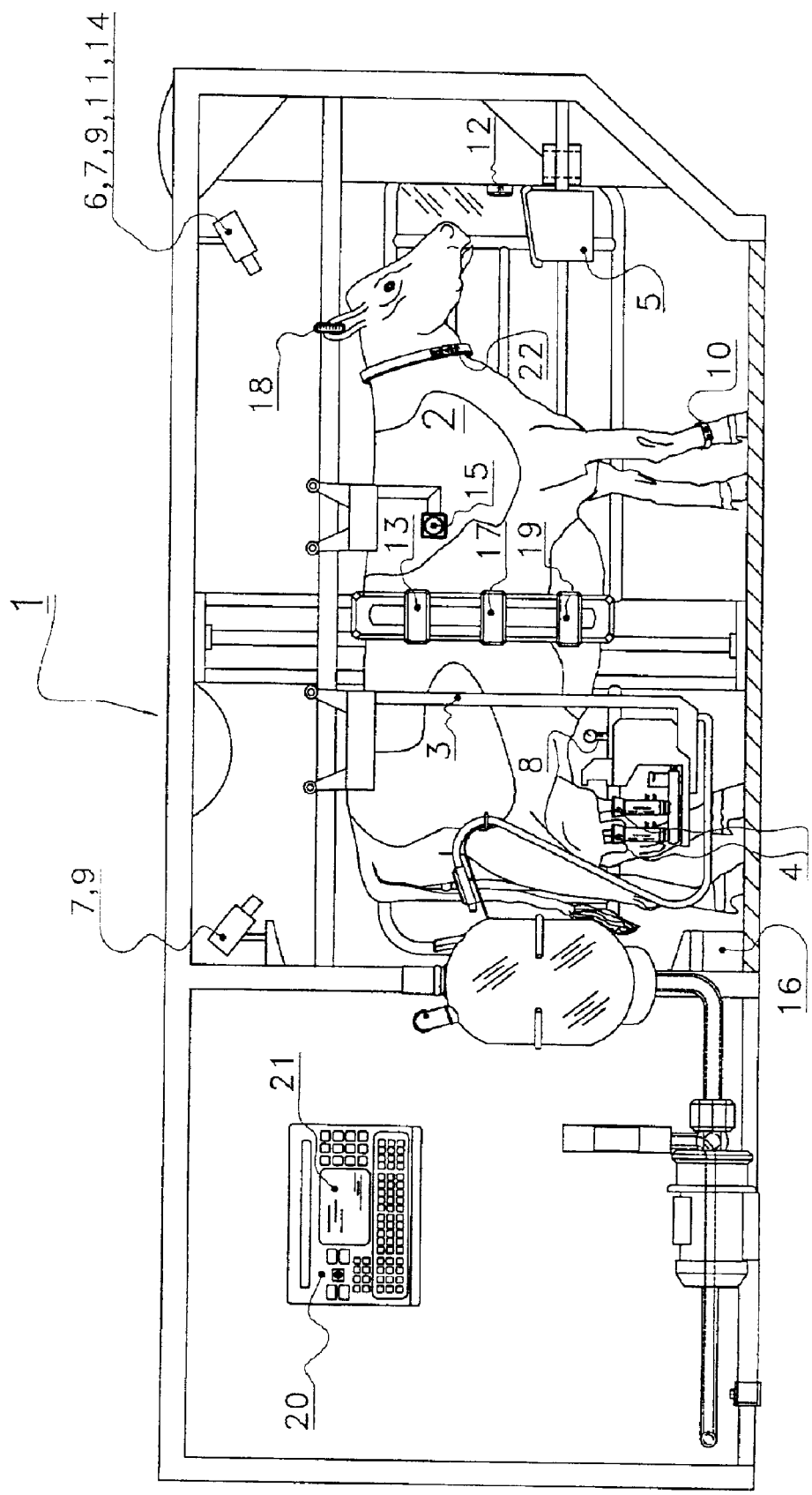
FIG. 1 is a side elevational view of a first embodiment according to the invention.
Figure 2:
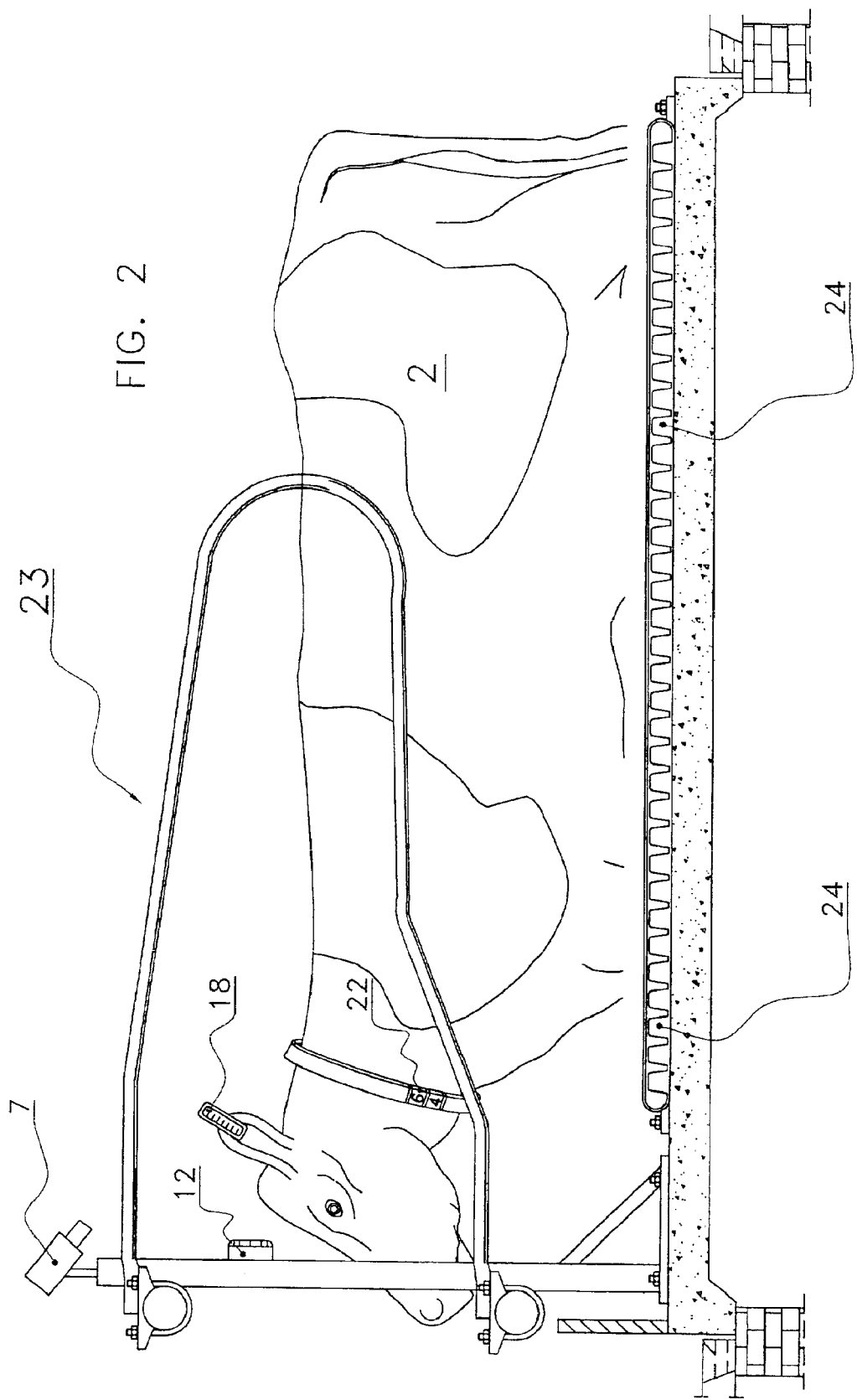
FIG. 2 shows a second embodiment of a device according to the invention.

The invention can be applied to all animals, but hereinafter the invention will be explained in a non-limiting manner with reference to dairy cows 2, as shown in FIGS. 1 and 2. When dairy cows 2 are nervous or stressed, in particular before, during and after milking, they appear to behave restlessly, accentuated by frequent movements of the body, stepping or kicking with one of the hind legs. Additionally important physiological systems appear to be activated, as a result of which inter alia the production of hormones, the heart beat rate, and plasma concentrations of the blood are influenced. A comparison of the situation before and during, and preferably also after milking, may provide useful information.

The increased production of adrenaline before and during milking is highly undesirable, as adrenaline influences the concentration of oxytocin that stimulates the milk yield.

Behavior (stepping; kicking; position of head, tail, ears); heart beat; blood samples inter alia for analysis of oxytocin, cortisol, adrenaline, noradrenaline, percentage of oxygen, content of blood cells and the like, are constantly (that is, regularly or continuously) measured. In particular these parameters are measured before and during, and preferably also after milking, and milk related data, such as fat content, protein content and the like, are preferably stored. In particular the stress related data together with the milk flow for each udder quarter of animals are stored during milking. An animal identification 22 ensures that these data are stored for each animal.

Heart beat can for example be measured by means of a band 17 around the leg or the abdomen of a cow 2. Alternatively or additionally a heart beat meter of known may be disposed on a cow 2 near a place where an artery is located, in this connection the udder, or an ear of the cow can be taken into consideration. A suitable heart monitoring system can for example be obtained with a Polar Electro Oy, Helsinki, Finland. Alternatively a heart beat meter can be included in at least one of the teat cups 4.

Blood samples can be taken by suitable devices, comprising a syringe and analyzing equipment 15, at places where a cow 2 regularly stays. There may for example be provided in a milking robot 3 (FIG. 1) a robot arm carrying a syringe taking automatically a blood sample during milking without treatment of a cow 2 being hindered thereby. Such a device may also be disposed, for example, in the cubicle 23 with cushion 24 (see FIG. 2), a feeding stations or the like. There may also be provided an automatically controlled vehicle containing such a blood sampling device, and possibly other stress measuring devices. Such an automatically controlled vehicle preferably comprises an animal identification system and may inter alia be GPS-controlled.

To that end the vehicle comprises a computer with transmitter-receiver, so that the computer is able to receive data from the GPS-system on the position of a cow 2 that wears for that purpose a special transponder 22. Thus the vehicle can be programmed for measuring a certain number of times per day the stress situation of all cows belonging to a herd.

Blood samples can also be taken by means of a blood sample taking device which are provided in a cow 2.

In the shed, in particular in the waiting area in front of a milking compartment, and in the milking compartment 1, rows of cameras 6, 7, 9, 11 and 14 are disposed for observing cows 2. It will thus be appreciated that a plurality of cameras can be used. The video images are analyzed by movement recognition programs for the purpose of determining parameters such as stepping; kicking; positions of heat, tail, ears, back curvature (indication of muscular tension); position of tongue; eye movements. To that end the image for each cow 2 is compared with stored historical data regarding the relevant cow 2.

Further the urine and excrement of cows 2 are analyzed (on a less frequent basis) by an excrement analyzing device 16. In this connection manually obtaining samples can also be taken into consideration.

There may further be provided a hygrometer 8, a step counter 10, a smell meter 12, a muscle contraction meter 13, a thermometer 18 and a muscle vibration meter 19.

In addition to a step counter 10 other means for determining the number of steps are possible. When for example a so-called weighing floor is provided in milking compartment, on the bass of the speed variation of the measured values there can be obtained an indication about the number of steps. Quick variation in the weighing values are an indication of a more restless animal rather than almost no variation. Besides, with milking robots making use of a so-called "cow follower," the nervousness or stress of a cow can be deduced from the movements the "cow follower" has to carry out.

All these measurement data are transmitted by the stress measuring devices to or read by a central unit 20 that is possibly connected with several reading devices disposed at several places in the shed. Said central unit 20 comprises a computer having a memory in which, for each cow 2, limit values and tolerance ranges in relation to the relevant parameters for stress behavior are stored. The momentary measured values are retained at least temporarily.

For analyzing the stress related data, such as the number of steps, position of the head, binomial and Poisson distributions which are known, as well as logit and log transformations are applied by the computer, for causing the central unit 20 to issue a signal on the stress behavior of the cow. This signal can give an indication of the stress behavior on a display screen 21 or a printer. In particular the dispersion of the Poisson distribution is estimated by the Pearson chi-quadratic statistics. Furthermore, associations between different parameters are deduced from Spearman's rank-order correlation coefficient. By means thereof, or by means of comparable other operations, it is possible to deduce for each cow 2 those parameters that are more relevant to the determination of stress behavior than other parameters. Thus there can be attributed a weighing factor to particular parameters. Moreover, it is then possible to distinguish whether a cow 2 is keen on entering milking compartment 1 or on the contrary is not so eager to be milked. This can further be deduced from the degree of stress during or after milking. When for example the degree of stress is high before milking, but strongly decreases during milking, it can be deduced therefrom that the cow had a so-called positive stress prior to being milked.

A comparison is possible when previously measured standard values are determined and inputted into the system. Furthermore, these standard values can continuously be updated on the basis of the measurements.

As described, FIG. 1 is a side view of a milking compartment 1 with a cow 2 present therein. Milking compartment 1 is provided with a milking robot 3 with teat cups 4 that can be connected automatically to the teats of cow 2 with the aid of milking robot 3. Near the front side of milking compartment 1 a feeding trough 5 is provided to which concentrate can be supplied in metered portions. Other components of the milking compartment and milking robot are not shown in the drawing for the sake of clearness.

As described, FIG. 2 shows a cubicle 23 with a cushion 24 on which a cow 2 is able to lie. In such a cubicle 23, a cow 2 can rest, ruminate and the like. For the sake of simplicity only a few possible components are shown, such as a camera 7, smell meter 12, thermometer 18, and an animal identification means 22, but it will be understood that also other stress measuring devices as described above can be used.

The invention also relates to making use of the stress of an animal for the purpose of managing or monitoring or both a herd of animals. To that end the device is further provided with an animal identification system represented by means 22 which are well known in the art. This animal identification system 22 contains reading devices for reading an animal identification means 22 worn by an animal, in particular a cow. As known, data from the animal identification system are centrally stored by a central unit 20 provided with a computer having a memory containing several memory files. Central unit 20 centrally controls the functions of the device.

According to the invention the memory is provided for each animal of the herd with data in relation to the stress of that animal. These data can initially be inputted with the aid of data based on experience as known to the dairy farmer. The data in relation to the hierarchic order and the jostling behavior can additionally automatically be maintained and updated by the device.

The functioning of the device according to the invention will be explained in further detail with reference to the entrance to a milking compartment. However, it will be appreciated that the invention is not limited to this example, but can be applied to all automatic animal related treatments that are customary in managing a herd of animals.

When dairy animals wish to make use of milking robot 3 in milking compartment 1, they first have to enter a waiting area via one of a number of entrance gates. When it is detected that one of the animals in front of the entrance gates shows such a high stress that milking by milking robot 3 is undesirable at that moment, then the relevant entrance gate is blocked. Other, non-stressed animals can use one of the other entrance gates. The detection takes place by a known reading unit known. During milking the stress can be measured by means of stress measuring devices resent in the milking compartment.

A dairy animal that has been milked by milking robot 3 can leave milking compartment 1 via exit gates. Also in this situation the operation of the exit gates can be controlled partially on the basis of the stress of the animal. Thus it is possible to guide a stressed animal to a calming area via the exit gates.

The gates controlled by central unit 20 and thus the possibility of guiding an animal in depending on its degree of stress is provided. For the determination of the degree of stress one of the above described stress measuring devices can be used. In particular a stress measuring device can supply a signal to an alarm device in dependence of the degree of stress measured. Such an alarm signal may be an audible or visible signal, but may also be a call via a telecommunication network to the dairy farmer or a service department.

Although we have disclosed the preferred embodiments of our invention, it is to be understood that it is capable of other adaptations and modifications within the scope of the following claims:

Having thus disclosed our invention, what we claim as new and to be secured by Letters Patent of the United States of America:

1. An apparatus for monitoring an animal which comprises: a stress measuring device for determining the stress of the animal, the stress measuring device comprising at least one of the following instruments selected from a group consisting of an infrared meter for measuring an infrared image of the animal, a hygrometer for measuring the humidity of the fur or the nose of the animal, an iris scanner for determining the eye characteristics of the animal, a smell or odor meter for determining the breath or body odor of the animal, a muscular tension measuring instrument for determining the muscular tension of the animal, an excrement analyzing instrument for determining the characteristics of the excrement of the animal, and a muscle vibration meter for determining the muscle vibrations of the animal; a central unit comprising stress measurement data and a correspondence table, said correspondence table containing for said animal stress related data, a comparing means for comparing said stress measurement data with the data in said correspondence table, and a program for providing on the basis of the comparison by the comparing means, an indication of the amount of stress of the animal, said program supplying a prognosis of stress behavior of said animal.

2. An apparatus in accordance with claim 1, which comprises at least two of said instruments, said central unit containing an algorithm for attributing a weighing factor to a particular stress measurement data for said at least two of said instruments.

3. An apparatus in accordance with claim 1, which is further provided with an animal identification system.

4. An apparatus in accordance with claim 3, wherein said animal identification system is capable of being detected by a GPS-system.

5. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising an infrared meter for measuring an infrared image of said animal.

6. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a video camera for determining the position of parts of said animal consisting of said animal's ears, head or tail, or any combination thereof.

7. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a hygrometer for determining the humidity of the fur or the nose, or both, of said animal.

8. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a movement behavior meter consisting of a video camera, a step counter, a weighing floor, or a cow follower or any combination thereof for determining the movement behavior of said animal.

9. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising an eye meter consisting of a video camera or a scanner, or both, for determining the eye characteristics of said animal.

10. An apparatus for use in the process of milking a milk producing animal, which apparatus comprises a stress measuring device that determines the degree of relatively momentary stress of said animal before or during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a muscular tension measuring instrument consisting of a muscle contraction meter or a video camera, or both, for determining the muscular tension of said animal.

11. An apparatus for use in the process of milking a milk producing animal, which apparatus comprises a stress measuring device that determines the degree of relatively momentary stress of said animal before or during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a video camera for determining whether said animal has its tongue outside of its mouth.

12. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a blood analyzer for determining the concentration of blood components of said animal's blood.

13. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising excrement analyzing instrument for determining the characteristics of said animal's excrement.

14. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a muscular vibration meter for determining the muscular vibration of said animal.

15. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said stress measuring device comprising a transmitter for transmitting data from said device to said computer.

16. An apparatus in accordance with claim 15, wherein said stress measuring device is provided with a receiver for receiving a transmission order.

17. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said computer comprising a central unit and having a memory for processing said measurement, said central unit being provided with a reading means for reading said stress measuring device.

18. An apparatus for use in the process of milking milk producing animals, which apparatus comprises a stress measuring device that determines the degree of relatively momentary stress of each said animal before and during the milking process, a computer operationally associated with said device to which data of each said animal's degree of relatively momentary stress before and during milking of such animal are transmitted from said device and stored in said computer as a measurement of such animal's degree of relatively momentary stress experienced by such animal incidental to the milking process before and during milking, said computer comprising a central unit and having a memory for processing said measurement, said central unit comprising a correspondence table, said correspondence table containing for each said animal milked in said milking process stress related data including limit values, historical data, and tolerance ranges.

19. An apparatus in accordance with claim 18, wherein said control unit comprises a comparing device for comparing said measurement with the data in said correspondence table for comparing measurements obtained for each said animal in said milking process.

20. An apparatus in accordance with claim 19, wherein said computer is loaded with a program for providing, on the basis of the comparison of said comparing means, an indication about the amount of stress which has been experienced by each said animal.

21. An apparatus in accordance with claim 20, wherein said computer program provides a prognosis of each of said animals' stress behavior.

22. An apparatus in accordance with claim 21, comprising a plurality of stress measuring instruments, said computer containing an algorithm for attributing a weighing factor to a particular said measurement.

23. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, said computer comprising a central unit and having a memory for processing said measurement, and being provided with a single issuing device for issuing a signal after receipt and processing of said measurement.

24. An apparatus in accordance with claim 23, wherein said signal is displayed on a screen which provides information about the stress behavior of said animal.

25. An apparatus for use in the process of milking a milk producing animal, which apparatus comprises a stress measuring device that determines the degree of relatively momentary stress of said animal before and during the milking process, a computer operationally associated with said device to which data of said animal's degree of relatively momentary stress before and during milking of the animal are transmitted from said device and stored in said computer as a measurement of the animal's degree of relatively momentary stress experienced by the animal incidental to the milking process before and during milking, the apparatus further comprising an animal identification system, said animal identification system being detected by a GPS-system.

26. A milking process for the milking of a milk producing animal which comprises the step of measuring the degree of relatively momentary stress of said animal before or during the milking of said animal which affects the yield or quality of milk produced by said animal during said milking and transmitting said measurements to a computer memory as data relative to the yield and quality of milk that it is expected said animal will produce when it experiences said relatively momentary stress during or before it is milked, and further comprising the step of automatically effecting a procedure on said animal which has an effect on said degree of relatively momentary stress of said animal to increase the yield and quality of milk produced by said animal.

27. A milking process for the milking of a milk producing animal which comprises the step of measuring the degree of relatively momentary stress of said animal before or during the milking of said animal which affects the yield or quality of milk produced by said animal during said milking and transmitting said measurement to a computer memory as data relative to the yield and quality of milk which it is expected said animal will produce when it experiences said relatively momentary stress during or before it is milked, and the step of performing an automatic animal related procedure on said animal based on said stress measurement data of said animal.

28. A milking process for the milking of a milk producing animal which comprises the step of measuring the degree of relatively momentary stress of said animal before or during the milking of said animal which affects the yield or quality of milk produced by said animal during said milking and transmitting said measurement to a computer memory as data relative to the yield and quality of milk which it is expected said animal will produce when it experiences said relatively momentary stress during or before it is milked, the step of measuring the degree of relatively momentary stress of said animal comprising making an infrared image of said animal.

29. An apparatus for use in the process of milking a milk producing animal, which apparatus comprises a stress measuring device comprising at least two separate sensors that determine the degree of relatively momentary stress of said animal before and during the milking process, one of said sensors being at a milking compartment in which said animal is milked and the other sensing the existence of relatively momentary stress at a location remote from said milking compartment, a computer operationally associated with said device to which data of said animal's degrees of relatively momentary stress before and during milking of the animal are transmitted from said device and stored in said computer as measurements of the animal's degrees of relatively momentary stress experienced by the animal incidental to the milking process before and during milking.

30. An apparatus in accordance with claim 29, comprising a further sensor suitable for measuring and storing stress measurement data in said computer after the milking of said animal.

31. An apparatus in accordance with claim 29, which comprises means for determining milk related data which are transmitted to said computer and stored therein for each milking of said animal.

32. An apparatus in accordance with claim 31, wherein said animal's udder has four milk quarters and said means for determining milk related data includes further means for determining the milk flow from each milk quarter of said animal during the milking of said animal.

33. An apparatus in accordance with claim 29, comprising an animal identification system, a memory of said computer being adapted to contain for each animal milked by said milking process data relating to the relatively momentary stress experienced by each animal before and during the milking process.

34. An apparatus in accordance with claim 29, wherein said stress measuring device comprises a smell or odor meter for determining the breath or body odor of said animal.

35. An apparatus in accordance with claim 29, wherein said stress measuring device comprises a heartbeat meter for determining the heartbeat of the animal.

36. An apparatus in accordance with claim 29, wherein said stress measuring device comprising a thermometer for determining the temperature of said animal.

37. An apparatus in accordance with claim 29, wherein said milking compartment consists of a foremilking compartment, a cleaning compartment or a post-treating compartment or any combination thereof.

38. An apparatus in accordance with claim 29, wherein said milking compartment comprises a milking robot.

39. An apparatus in accordance with claim 29, wherein said stress measuring device comprises a buffer memory for containing a number of measurement data.

40. An apparatus in accordance with claim 29, wherein said computer comprises a central unit and having a memory for processing said measurement.

41. An apparatus in accordance with claim 29, and further comprising an animal identification system.

42. An apparatus in accordance with claim 29, wherein said stress measuring device provides a signal to an alarm means on the basis of the measured stress of said animal.

43. A milking process for the milking of a milk producing animal which comprises the step of measuring the stress experienced by said animal shortly before said milking and again while said animal is being milked to determine the degree of relatively momentary stress of said animal caused by the anticipation of being milked and the actual milking of said animal, measuring the yield or quality of milk produced by said animal during said milking and transmitting data of said measurements to a computer memory to learn how the yield or quality of milk from said animal is affected by said relatively momentary stresses as measured during and before it is milked.

44. A process in accordance with claim 43, wherein a step of measuring the degree of relatively momentary stress of said animal is also carried out after said milking.

45. A method in accordance with claim 43, which comprises the step of storing said degrees of relatively momentary stresses in said computer memory.

46. A process in accordance with claim 43, which comprises a step of determining other milk related data provided during said milking of said animal which are suitable for storing with said relatively momentary stress measurements data in said computer memory and storing said other milk related data therewith.

* * * * *